United States Patent [19]

Kato

[11] Patent Number: 5,438,890
[45] Date of Patent: Aug. 8, 1995

[54] CABLE POSITION ADJUSTING STRUCTURE

[75] Inventor: Kiyokazu Kato, Shizuoka, Japan

[73] Assignee: Suzuki Motor Corporation, Shizuoka, Japan

[21] Appl. No.: 124,338

[22] Filed: Sep. 20, 1993

[30] Foreign Application Priority Data

Feb. 26, 1993 [JP] Japan .................. 5-063034

[51] Int. Cl.$^6$ .................. F16C 1/22; F16C 1/08
[52] U.S. Cl. .................. 74/501.5 R; 74/502.4
[58] Field of Search ............ 74/501.5 R, 502.4, 502.6

[56] References Cited

U.S. PATENT DOCUMENTS

| | | | |
|---|---|---|---|
| 3,263,948 | 8/1966 | Conrad | 74/502.4 X |
| 3,546,962 | 12/1970 | Ruhala | 74/502.3 |
| 4,876,948 | 10/1989 | Yasukawa et al. | 74/502.6 X |
| 5,046,380 | 9/1991 | Matsumoto et al. | 74/502.4 |
| 5,222,413 | 6/1993 | Gallas et al. | 74/502.4 |
| 5,265,493 | 11/1993 | Solano et al. | 74/501.5 R |
| 5,280,733 | 1/1994 | Reasoner | 74/502.4 |

Primary Examiner—Charles A. Marmor
Assistant Examiner—Nathan O. Jensen
Attorney, Agent, or Firm—Flynn, Thiel, Boutell & Tanis

[57] ABSTRACT

A cable position adjusting structure having an inner cable for interconnecting with an operator side member to an opposite side member so that the opposite side member is activated in accordance with an action of the operator side member, and an outer sheath surrounding the inner cable. The cable position adjusting structure having a mounting portion provided at one end of the outer sheath. The mounting portion having an elongated opening extending generally in the same direction as an axial direction of the cable. A bracket portion for securing the mounting portion to a position plate is provided. A bolt secures the mounting portion to the bracket portion through the elongated opening, and a leaf spring urges the mounting portion against the bracket portion so that the tension of the cable can be set to a predetermined value.

6 Claims, 5 Drawing Sheets

CABLE ADJUSTING DIRECTION B

5,438,890

CABLE POSITION ADJUSTING STRUCTURE

FIELD OF THE INVENTION

This invention relates to a cable position adjusting structure, and particularly to a cable position adjusting structure comprising an inner cable for interconnecting an operator side or input member and an opposite side or output member so that the opposite side member is activated in accordance with an action of the operator side member, and an outer sheath surrounding the inner cable.

BACKGROUND OF THE INVENTION

As one example of a conventional cable actuator mechanism wherein an inner cable interconnects an operator side (i.e. input) member and an opposite side (i.e. output) member so that the opposite side member is activated in accordance with an action of the operator side member, and an outer sheath surrounds the inner cable, is where a shift lever side release plate serves as the operator side member and an ignition switch side release shaft serves as the opposite side member. The cable thus communicates an action of the shift lever side to the ignition switch side, so that an ignition key is interlocked by the action of the shift lever side.

As one example of a conventional select lever locking device for an automatic transmission, there is known, as disclosed in Japanese Patent Early Laid-Open Publication No. 1-249527, a device in which a detent pin implanted in a basal portion of a select lever extends through a detent hole of a detent plate disposed in the vicinity of the select lever, and a cam plate having a recess for receiving the detent pin is rotatably axially supported by the detent plate. A distal end of the cam plate is connected to a proximal end of a cable which is engaged with a key lock portion of the ignition switch. The cam plate is provided with a recess. A slider engageable in the recess is supported by the detent plate such that the slider is moved forwardly and backwardly with respect to the recess, the slider being controllably moved forwardly and backwardly in association with a predetermined operation.

Among the conventional cable position adjusting structures, there is one in which, as shown in FIG. 8, the tension of a cable 126 is adjusted by tightening a first nut 194 placed on one side (left-hand side in FIG. 8) of a bracket portion 142 which is disposed at a predetermined location and threadedly engaged with an outer sheath 132, and a second nut 196 is placed on the other side (right-hand side in FIG. 8) of the bracket portion 142. However, the structure in which two nuts 194 and 196 are used is inconvenient in that the tension of the cable 126 is difficult to accurately adjust to a predetermined tension value, and thus is disadvantageous in practical use.

FIG. 9 shows another conventional cable position adjusting structure in which a mounting portion 238 is provided on one end portion of an outer sheath 232, a bracket portion 242 is mounted on a cable 226 at a location so as to be shiftable toward the mounting portion 238, and a spiral spring 298 is disposed, in its compressed condition, between the mounting portion 238 and the bracket portion 242, whereby the tension of the cable 226 is adjusted under the influence of the spring 298. However, the above arrangement has the shortcoming that since the spring 298 is required to be mounted, in its compressed condition, between the mounting portion 238 and the bracket portion 242, the assembly thereof becomes difficult and more time and labor consuming.

To obviate the above shortcomings, according to the present invention, there is provided a cable position adjusting structure comprising an inner cable for interconnecting an operator side member and an opposite side member so that the opposite side member is activated in accordance with an action of the operator side member, and an outer sheath surrounds the inner cable. A mounting portion is mounted to one end of the outer sheath, the mounting portion being provided with an elongated opening extending in generally the same direction as the axial direction of the cable. A bracket portion is provided for securing the mounting portion, and a bolt tightens the mounting portion to the bracket portion through the elongated opening. A leaf spring urges the mounting portion against the bracket portion so that a tension of the cable is adjusted to a predetermined tension value.

A cutout can be formed in the mounting portion for communication with the elongated opening.

An engagement member can be provided on at least either the mounting portion or the bracket portion so that the mounting portion and the bracket portion are correctly positioned and prevented from rotating.

By virtue of the construction of the present invention mentioned above, the operator side member and the opposite side member are interconnected through the inner cable, the mounting portion mounted to one end of the outer sheath is mounted on the bracket portion, the resilient force of the leaf spring is exerted on the mounting portion, and thereafter the mounting portion and the bracket portion are fixedly tightened by the bolt, whereby the tension of the cable is automatically set to a predetermined tension value.

Furthermore, the operator side member and the opposite side member are intercommunicated through the inner cable, the bolt is temporarily secured to the bracket portion beforehand, the mounting portion is mounted on the bolt through the cutout, the resilient force of the leaf spring is exerted on the mounting portion, and thereafter the mounting portion and the bracket portion are fixedly tightened by the bolt, whereby the tension of the cable is set to the predetermined tension value.

Moreover, the operator side member and the opposite side member are intercommunicated through the inner cable, and the mounting portion provided at one end of the outer sheath is mounted on the bracket portion. At that time, the mounting portion and the bracket portion are correctly positioned and prevented from rotating by the engagement portion which is provided on at least the mounting portion or the bracket portion. Thereafter, the resilient force of the leaf spring is exerted on the mounting portion, and the mounting portion and the bracket portion are fixedly tightened by the bolt, whereby the tension of the cable is set to the predetermined tension value.

DETAILED DESCRIPTION

The present invention will be described hereinafter with reference to the drawings.

Figure 1:
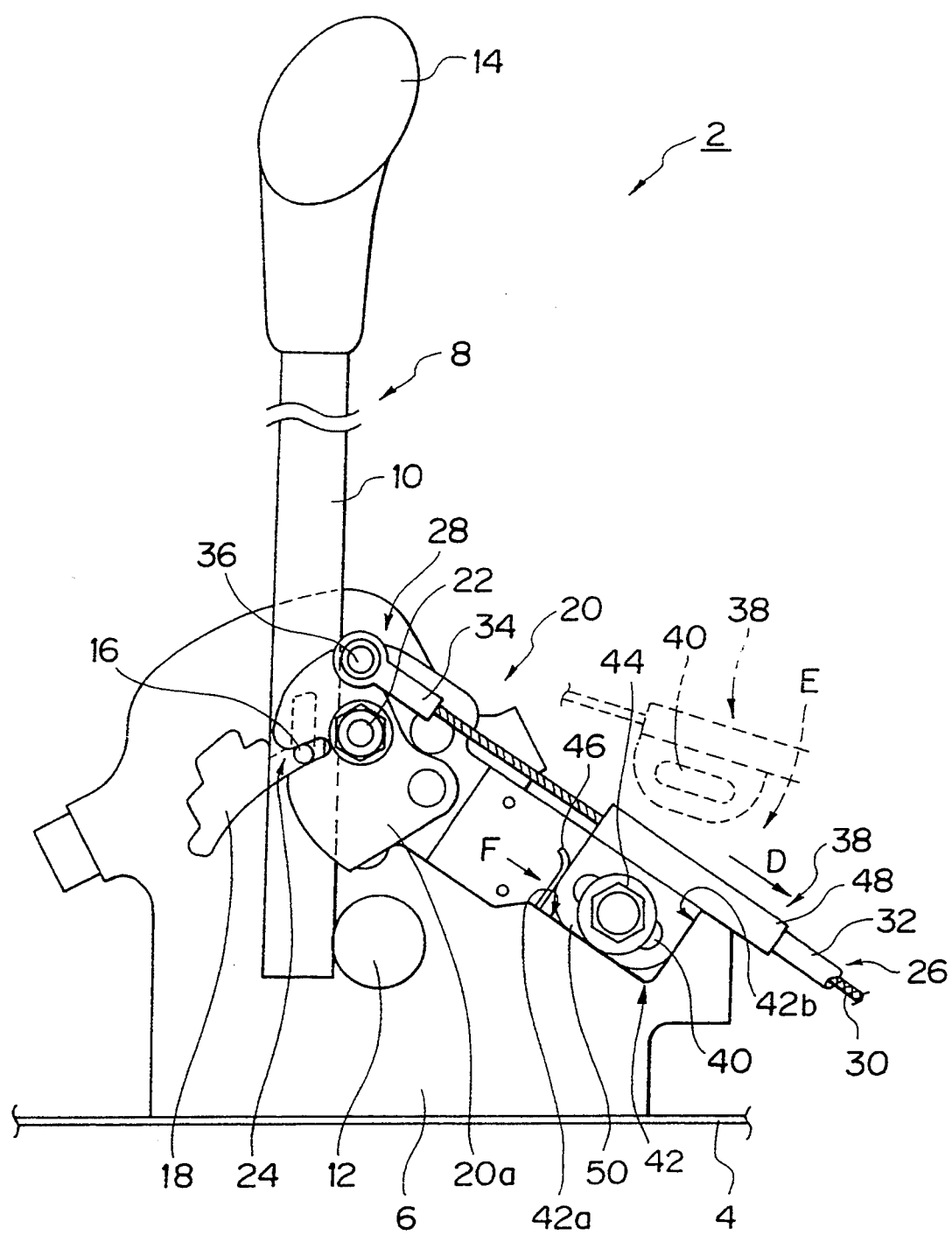
FIG 1 is a schematic explanatory view of a shift mechanism showing a first embodiment of the present invention.
Figure 2:
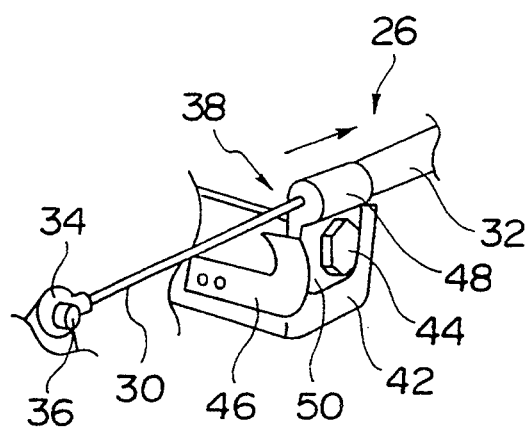
FIG. 2 is a schematic perspective view showing an engaging relation between the mounting portion and the bracket portion.

FIGS. 1 and 2 show a first embodiment of the present invention. In FIG. 1, reference number 2 denotes a shift mechanism. The shift mechanism 2 has a position plate or frame member 6 erected upwardly from a housing 4, and a lever shaft 10 of a select lever 8, a lower end of the lever shaft 10 being pivotally supported by a support pin 12. An upper end of the lever shaft 10 extends upwardly through a guide hole of a guide plate (not shown). Indicated on the guide plate (not shown) in order are various shift positions of the select lever 8 such as, for example, a park position (P), a reverse position (R), a neutral position (N), a drive position (D), a second-speed position (2), and a first-speed position (1). A grip 14 and a shift knob (not shown) are provided at an upper end of the lever shaft 10 of the select lever 8 extending through the guide hole of the guide plate. A rod (not shown) is axially movably disposed within the lever shaft 10 of the select lever 8. A position pin 16 is attached to a lower end of the rod. A distal end of the rod not shown is operated by the shift knob to cause the position pin 16 to move forwardly and backwardly. The position plate 6 has a stepped opening 18 each step of which corresponds to each shift position of the select lever 8.

In an automatic transmission (not shown), the position pin 16 is moved forwardly and backwardly by pushing and releasing operation of the shift knob (not shown) of the select lever 8 through the rod (not shown), the position pin 16 is brought into engagement with and disengagement from each step of the stepped opening 18 of the position plate 6, and the select lever 8 is shifted to each of the various shift positions P, R, N, D, 2, and 1 to thereby switch the engagement position. A cam 20a for a key interlock mechanism 20 is normally and reversely rotatably provided in the vicinity of the stepped opening 18 through a cam shaft portion 22. A recess 24 for receiving the position pin and a mounting portion 28 of a cable 26 assembly for the key interlock mechanism 20 are provided on the cam 20a.

The cable assembly 26 has an inner cable 30 and outer sheath 32 surrounding the inner cable 30. An eye end 34 for attachment is firmly secured to one end portion of the inner cable 30. The eye end 34 secured to the end of the inner cable 30 is mounted on the mounting portion 28 of the cam 20 through a mounting pin 36, while an eye end (not shown) secured to the other end of the inner cable 30 is mounted on an ignition key (not shown) side. The key interlock mechanism 20 having the cam 20a and the cable assembly 26 prevents the ignition key (not shown) from being rotated when the select lever is in one of the shift positions excepting the park position (P).

The outer sheath 32 is provided at one end thereof with a mounting portion 38. The mounting portion 38 comprises a cylindrical portion 48 having an outer diameter larger than the outer sheath 32, and a generally rectangular plate portion 50 extending radially from the cylindrical portion 48. An elongated opening 40 in the plate portion 50 extends generally in the same direction as an axis (D-direction in FIG. 1) of the cable assembly 26. The position plate 6 is provided with a recessed or bracket portion 42. Bracket portion 42 defines an inwardly opening pocket for receiving the mounting portion. A first surface portion or sliding surface 42a extends generally parallel to the axis (D-direction in FIG. 1) of the cable 26, a second surface portion or side wall 42b extends toward the cable assembly generally perpendicular to the first surface portion 42a at an end of the bracket portion 42 extending toward the opposite side member, a rear wall portion (not shown) set back from the surface of the position plate 6 illustrated in FIG. 1, and a threaded bolt hole (not shown) extending through the rear wall portion. The mounting portion 38 is fixed by the first and second surface portions 42a and 42b and the bolt hole portion (not shown). A fastener or bolt 44 is provided for tightening or securing the mounting portion 38 to the bolt hole of the rear wall (not shown) through the elongated opening 40 in the plate portion 50. The bracket portion 42 is provided with a leaf spring 46 for urging the mounting portion 38 against the second surface portion 42b in order to set the tension of the cable assembly 26 to a predetermined value. The predetermined tension value to be imparted on the cable assembly 26 is set according to the position of the second surface portion 42b along the first surface portion 42a. The leaf spring 46 is disposed at the end of the first surface portion 42a extending toward the operator side member. An upper end of the leaf spring 46 is curved outwardly. The leaf spring 46 has a stored-energy acting from one side of the first surface portion 42a toward the other side thereof, i.e. toward the second surface portion (F-direction in FIG. 1). Owing to the stored-energy of the leaf spring 46, the leaf spring 46 urges the outer sheath 32 of the cable assembly 26 toward the other end of the cable assembly 26, i.e. toward the opposite side member. The mounting portion 38 is fixedly tightened to the bracket portion 42 by the bolt 44.

The operation of the tension setting feature will now be described. For setting the tension of the cable assembly 26 to the predetermined value, the cam 20a for the key interlock mechanism 20 and the ignition key (not shown) are intercommunicated through the inner cable 30, and the mounting portion 38 provided on one end of the outer sheath 32 surrounding the inner cable 30 is turned downward as indicated by the arrow E of FIG. 1 so as to facilitate mounting on the bracket portion 42. The stored-energy of the leaf spring 46 is exerted to the plate portion 50 so that the position of the mounting portion 38 is moved in a direction as indicated by the arrow D of FIG. 1 until the plate portion 50 abuts the second surface portion 42b. The second surface portion 42b acts as a stop plate for the plate portion 50. Thereafter, the mounting portion 38 and the bracket portion 42 are fixedly tightened by the bolt 44. Owing to the above arrangement, the tension of the cable assembly 26 can be set to a predetermined tension value under the influence of the leaf spring 46, and the cable assembly 26 can be prevented from loosening, and thus is advantageous in practical use. Since the upper end of the leaf spring 46 is bent outwardly, the mounting efficiency is enhanced compared with the conventional device and thus advantageous in view of practical use.

Figure 3:
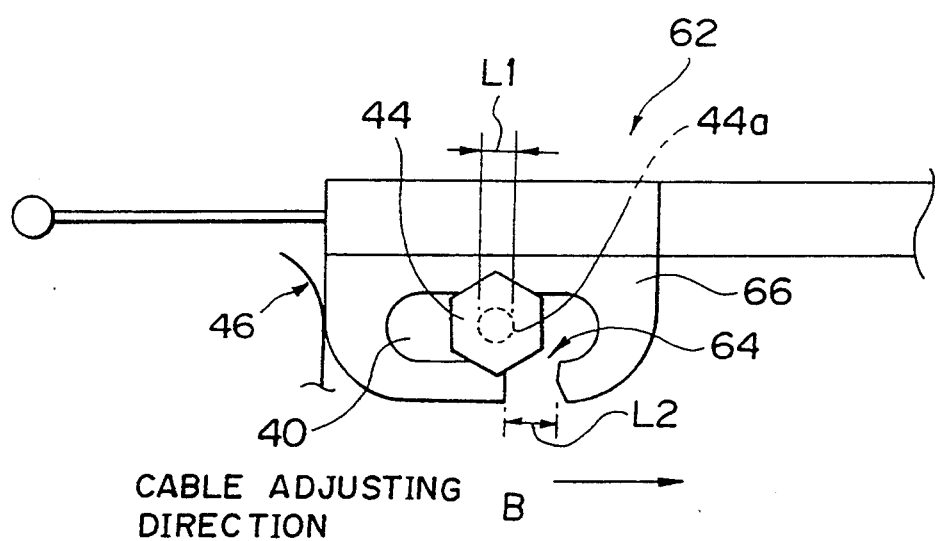
FIG. 3 is a schematic side view of a mounting portion showing a second embodiment of the present invention.
Figure 4:
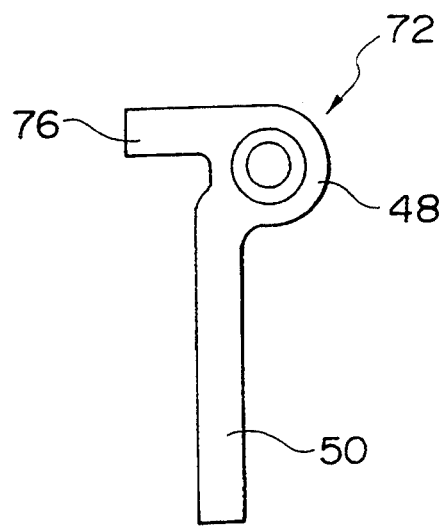
FIG. 4 is a schematic front view of the mounting portion showing a third embodiment of the present invention.
Figure 5:
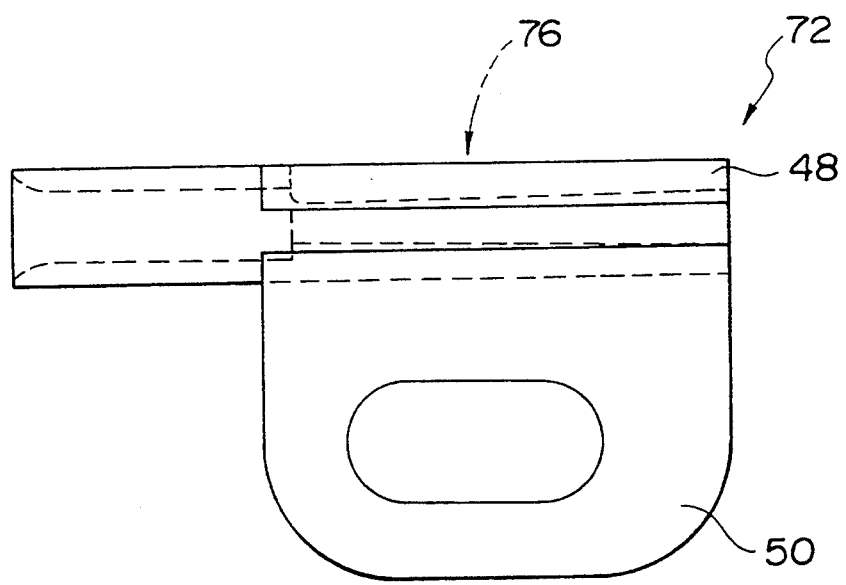
FIG. 5 is a schematic outer surface view of the mounting portion.
Figure 6:
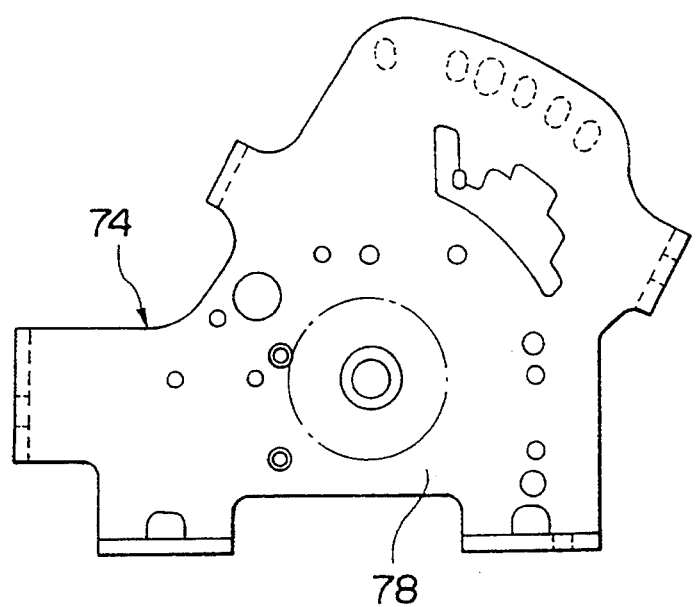
FIG. 6 is a schematic explanatory view of the position plate constituting the shift mechanism.
Figure 7:
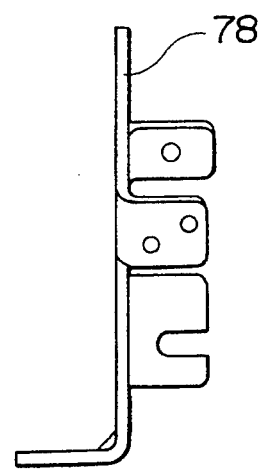
FIG. 7 is a schematic perspective view of the position plate.
Figure 8:
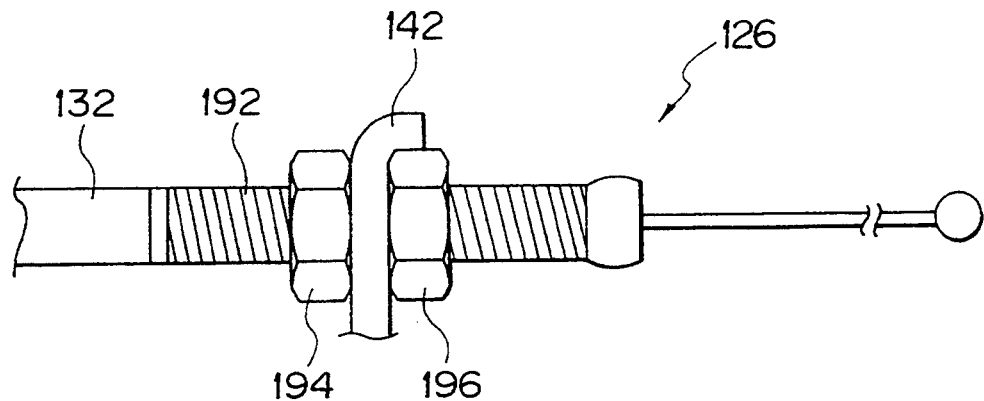
FIG. 8 is a schematic explanatory view of a cable position adjusting structure according to the prior art.
Figure 9:
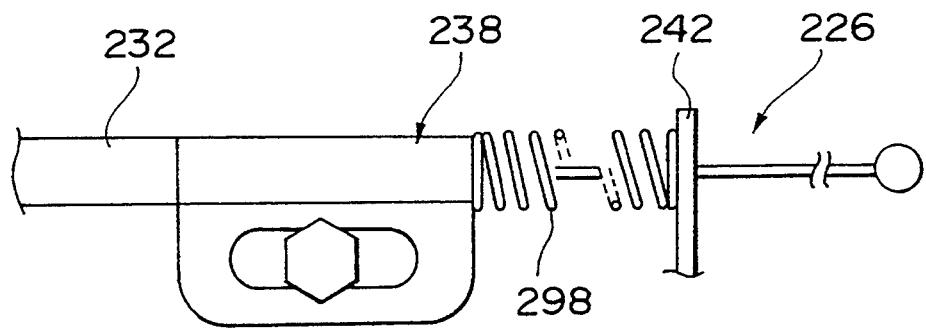
FIG. 9 is a schematic explanatory view of another cable position adjusting structure according to the prior art.

FIG. 3 shows a second embodiment of the present invention. In this second embodiment, those parts exhibiting the same functions as the first embodiment are denoted by identical reference numerals, respectively.

The feature of this second embodiment is that a cutout portion 64 is communicated with the elongated opening 40 of plate portion 66 extending from a mounting portion 62. That is, the cutout portion 64 is formed at a location displaced rightwardly of the plate portion 66 of the mounting portion 62 such that the cutout portion 62 is oriented in a direction perpendicular (vertical direction) to the axis (lateral direction of FIG. 3) of the cable assembly 26. The cutout portion 64 has a width L2 larger than the diameter L1 of a male-threaded portion 44a of the bolt 44.

Accordingly, the bolt 44 is temporarily secured to the bracket portion (not shown) beforehand, the mounting portion 62 is mounted on the bolt 44 through the cutout portion 64 communicated with the elongated opening 40, the resilient force of the leaf spring 46 is exerted to the mounting portion 62, and thereafter the mounting portion 62 and the bracket portion (not shown) are fixedly tightened by the bolt 44. By virtue of the foregoing arrangement, the bolt 44 can be prethreaded beforehand, thus the mounting efficiency of the mounting portion 62 with respect to the bracket portion (not shown) is enhanced, and thus advantageous in view of practical use.

Also, as in the first embodiment, the tension of the cable assembly 26 can be set by the resilient force of the leaf spring 46, and the cable assembly 26 can be prevented from loosening and thus advantageous in view of practical use. Furthermore, since the upper end of the leaf spring 46 is bent outwardly, the mounting efficiency of the mounting portion 62 is enhanced compared with the conventional device and is thus advantageous in practical use.

FIGS. 4 through 7 show a third embodiment of the present invention. The feature of this third embodiment is that an engagement portion or arm 76 is provided on at least either of a mounting portion 72 or a bracket portion 74 so that the mounting portion 72 and the bracket portion 74 are correctly positioned and prevented from rotating.

That is, the engagement portion 76 is provided on at least either of the mounting portion 72 or the bracket portion 74 mounted on a position plate 78. When the cylindrical portion 48 is provided on the mounting portion 72, the engagement portion 76 is in perpendicular or transverse relation to the plate portion 50 of the mounting portion 72 and projects radially from one side (left-hand side in FIG. 4) of the cylindrical portion 48 for engaging with the recessed portion to correctly position and prevent rotation of the plate portion of the mounting portion with respect to the recessed portion. When the engagement portion 76 is provided on the recessed bracket portion, the engagement portion 76 engages the mounting portion. Accordingly, the mounting portion 72 and the bracket portion 74 can be reliably positioned when mounting, and the mounting portion 72 can be prevented from rotating. Moreover, the mounting efficiency can be enhanced and thus advantageous in view of practice use.

Also, as in the above-mentioned first and second embodiments, the tension of the cable assembly (not shown) can be set to the predetermined tension value by the resilient force of the leaf spring (not shown), and the cable assembly (not shown) can be prevented from being loosened and thus advantageous in view of practical use. Furthermore, since the upper end of the leaf spring (not shown) is bent outwardly, the mounting efficiency is enhanced compared with the conventional device and thus advantageous in view of practical use.

It should be understood that the present invention is not limited to the above-mentioned first to third embodiments, and various changes and modifications can be made.

For example, in the first embodiment of the present invention, although the leaf spring is disposed at one side of the first surface portion, it may be arranged such that the leaf spring is disposed at the side opposite the first surface portion so that the adjusting direction of the tension of the cable is changed.

In the second embodiment of the present invention, although the cutout portion is formed in a location displaced rightwardly of the plate-like portion of the mounting portion so that the cutout portion is oriented in a perpendicular direction to the axis of the cable, it may be arranged such that the cutout portion is formed in a generally parallel relation to the axis of the cable and oriented rightwardly.

Furthermore, in the third embodiment of the present invention, although the engagement portion is in perpendicular relation to the plate portion of the mounting portion and projects from one side of the cylindrical portion so that the mounting portion can be correctly positioned and prevented from being rotated, the engagement portion may be of any structure as long as the mounting portion can be correctly positioned and prevented from rotating. The engagement portion may be provided with a projection (or a recess) for engagement with a recess (or a projection) of a counterpart.

In the third embodiment of the present invention, although the engagement portion is formed on only the mounting portion, it may be provided on only the bracket portion or both the mounting portion and bracket portion.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A cable position adjusting apparatus for a cable assembly having an inner cable which interconnects an input member to an output member so that the output member is activated in accordance with an action of the input member, and an outer sheath surrounding the inner cable, the adjusting apparatus comprising:
   a frame member;
   mounting means attached to the outer sheath at an end thereof for securing the cable assembly to the frame member, said mounting means including a hollow cylindrical portion fixedly secured to and surrounding the outer sheath, a generally rectangular plate portion extending radially from said cylindrical portion and having a plate side wall extending traverse to an axis extending coincident with said inner cable, and an elongated opening within said plate portion extending coincident with said axis for permitting a fastener to pass therethrough to secure said plate portion to said frame member;

receiving means associated with said frame member for slidably supporting said plate portion of said mounting means along said axis extending coincident with the inner cable, said receiving means including a side wall extending traverse to said axis and facing said plate side wall;

urging means for slidably urging said plate portion of said mounting means along said axis toward said side wall of said receiving means with said frame side wall being disposed against said side wall of said receiving means so that a tension of the inner cable is set to a predetermined value; and at least one said fastener for fixedly securing said mounting means to said frame member.

2. The apparatus as claimed in claim 1, wherein said plate portion further includes a cutout portion disposed on said plate portion for communicating with said elongated opening to facilitate said plate portion engaging said fastener.

3. The apparatus as claimed in claim 1, wherein said plate portion further includes an arm extending radially from said cylindrical portion and transverse to said plate portion for engaging with said receiving means to correctly position said plate portion with respect to said receiving means, and to prevent said plate portion from rotating with respect to said receiving means.

4. The apparatus as claimed in claim 1, wherein said frame member is a position plate, and said receiving means is a recessed portion of said position plate for accommodating said mounting means, said recessed portion being defined by said side wall, said urging means which is a leaf spring extending substantially parallel with and a spaced apart distance from said side wall to receive said plate portion therebetween, a sliding surface extending along said axis between said leaf spring and said side wall, and a recessed back wall having a threaded bore therein for receiving said fastener.

5. The apparatus as claimed in claim 4, wherein said recessed portion includes an arm for engaging with said mounting means to correctly position said mounting means with respect to said receiving means, and to prevent said mounting means from rotating with respect to said receiving means.

6. A cable position adjusting apparatus for a cable assembly having an inner cable which interconnects an input member to an output member so that the output member is activated in accordance with an action of the input member, and an outer sheath surrounding the inner cable, the adjusting apparatus comprising:

a fastener;

a mounting unit attached to the outer sheath at an end thereof and including a hollow cylindrical portion fixedly secured to and surrounding the outer sheath, a generally rectangular plate portion extending radially from said cylindrical portion and having a plate side wall extending traverse to an axis oriented coincident with said inner cable, and an elongated opening within said plate portion extending coincident with said axis for permitting said fastener to pass therethrough; and a frame member having a recessed portion for slidably receiving said plate portion of said mounting unit, said recessed portion defined by a recess side wall extending traverse to said axis and facing said plate side wall, urging means extending substantially parallel with and a spaced apart distance from said recess side wall for slidably urging said plate portion along said axis toward said recess side wall with said plate side wall abutting against said recess side wall so that a tension of the inner cable is set to a predetermined value, a sliding surface extending along said axis between said urging means and said frame side wall, and a recessed back wall having a threaded bore therein for receiving said fastener to fixedly secure said plate portion to said frame member.

* * * * *